Patented May 16, 1933

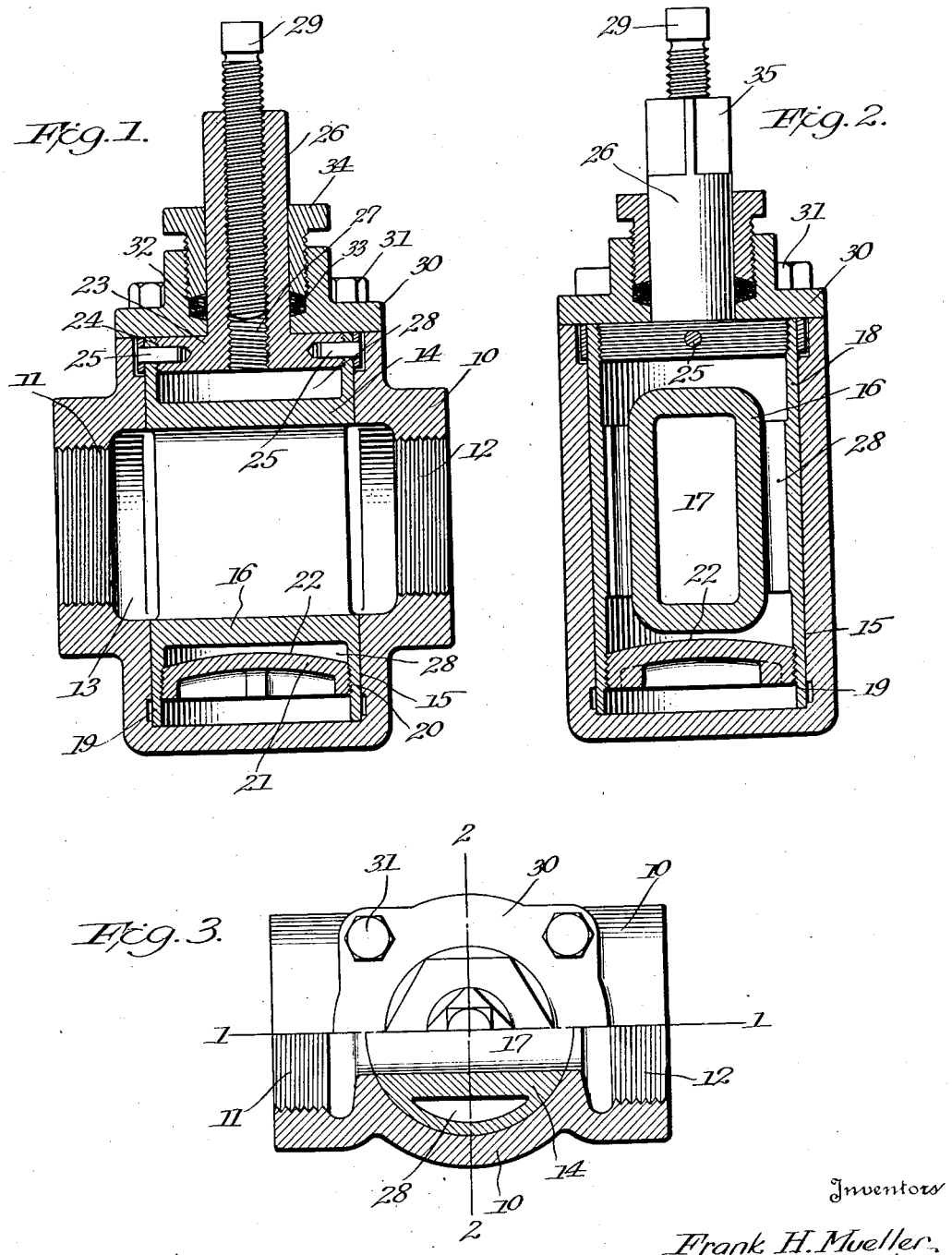

1,909,303

UNITED STATES PATENT OFFICE

FRANK H. MUELLER AND ROBERT H. MUELLER, OF DECATUR, ILLINOIS, ASSIGNORS TO MUELLER CO., OF DECATUR, ILLINOIS, A CORPORATION OF ILLINOIS

EXPANSIBLE PLUG VALVE

Application filed July 2, 1931. Serial No. 548,419.

The present invention relates to rotary valves and more especially to an improved plug construction for controlling the flow of fluid through the valve casing.

An essential object of the invention is to provide a rotary valve with an expansible and contractible plug arranged to be actuated by the variation of the fluid pressure confined within the valve plug.

A further object comprehends the provision of a deformable plug including an inner wall portion having a passage arranged to communicate with the inlet and outlet openings of the casing, and an outer wall portion of less thickness than the inner wall portion and arranged to vary in diameter so as to effectively engage the casing to prevent leakage and to be released from engagement therewith to permit the free rotation of the plug.

A further object consists in associating with the expansible plug, end closure caps or members which coact with the spaced wall portions of the plug to provide a continuous passage for the circulating fluid. Additionally, means are associated with one of the closure members for varying the pressure of the confined liquid in the passage to cause the contraction and expansion of the outer walled portions of the plug relative to the casing.

Other objects and advantages will become apparent from the following description when taken in conjunction with the accompanying drawing.

Referring to the drawing in which is shown a preferred embodiment of the invention, Figure 1 is a sectional view taken substantially along the line 1—1 of Figure 3, Figure 2 is a sectional view taken substantially along the line 2—2 of Figure 3, and Figure 3 is a plan of the invention, with parts in section.

Referring to the drawing in which like numerals indicate like parts in the several views, 10 designates a valve casing or body having the usual inlet port 11 and outlet port 12 that communicate with the valve chamber 13. The supply of fluid such as gas, steam, water or the like through the casing is preferably controlled by a rotatable cylindrical deformable plug or valve 14, which extends into a transverse opening 15 that communicates with the chamber 13, the wall of the opening 15 constituting a seating surface for the plug 14.

The valve 14 is preferably made of any suitable expansible and contractible material, such as rubber or the like and may comprise an inner elongated wall portion 16 having a passage 17 arranged to be moved into and out of registration with the inlet opening 11 and the outer opening 12. The plug also has an outer tubular or cylindrical wall portion 18, which is normally of a diameter slightly smaller than the opening 15, so that it may be rotatably positioned within the casing and the passage 17 brought into and out of registration with the inlet and outlet openings 11 and 12 respectively to control the flow of the supply through the casing. The outer wall 18 is of less thickness than the inner wall 16, so as to be responsive to the variation in the fluid pressure, in order to either effectively engage the adjacent wall of the opening 15 to maintain a pressure-tight seal against the walls of the casing, or be released from engagement therewith to permit the free rotation of the plug 14.

The lower or inner end 19 of the outer wall 18 of the plug is internally threaded as at 20, so as to receive the complementary threaded portion of a deformable end closure member or cap 21, which cap has a convex surface 22 that is spaced from the adjacent side of the inner wall portion 16.

The upper or outer end of the plug 14 is closed by a rigid cap or member 23, which may be externally threaded as at 24 to receive the complementary internal threads of the wall 18 and is preferably secured thereto by the locking pins 25. The member 23 has a reduced operating stem 26, that is formed with an internally threaded bore 27, which communicates at its lower end with a continuous passage 28 formed by the spaced walls of the plug 14 and the caps 20 and 23.

A set screw 29 extends a limited distance within the bore 27 while any suitable heavy or plastic viscous material or fluid is confined within the continuous passage 28 and allowed to enter the lower portion of the bore 27 to an extent determined by the screw 29. It will be seen that the pressure exerted on the incompressible fluid in the passage 28 may be varied by the adjusting of the set screw 29, so that in its normal position the outer wall 18 of the plug will be of slightly less diameter than the opening 15 to permit the plug to rotate relative to the casing, so as to bring the passage 17 into and out of registration with the inlet and outlet openings. On the other hand, when the screw 29 is moved inwardly the liquid will force the outer wall 18 of the plug into tight engagement with the wall of the opening 15, so as to prevent leakage thereby.

The plug 14 and its associated parts may be detachably mounted in the casing through the instrumentality of a cover plate 30 which is connected to the top of the casing by the bolts 31 and may be formed with an enlarged internal threaded recess 32 in which is positioned a packing 33 and an adjustable gland 34, so as to provide a gasket tight joint between the stem 26 and the casing, in order to prevent the escape of any of the fluid. The outer end of the stem 26 preferably terminates in a polygonal shaped head 35 for receiving any suitable tool in order to impart rotation to the plug when the pressure of the liquid in the passage 28 is reduced to move the wall 18 out of tight engagement with the seating surface 15.

It will be seen that in operation the set screw 29 is first adjusted, so that the plug 14 assumes a position which permits the rotation thereof within the casing. Upon a slight downward pressure being exerted by the screw or bolt 29 on the fluid, the outer wall 18 is expanded or increased in diameter, forcing the same into binding engagement with the adjacent wall of the casing. As the outer wall 18 is larger in diameter and of thinner section or width than the inner wall 16, it is more responsive to deformation by the increase of pressure of the fluid in the passage 28 than the inner wall 16. Since the expansion of the wall 18 is of quite restricted extent, it is well within the elastic limits of the material of which the plug 14 is composed, so that when the pressure is reduced in the passage 28 by unscrewing the screw or bolt 29 the wall 18 will promptly return to its original or normal shape, so that the plug may be free to rotate within the casing.

In order to insure the proper expansion and contraction of the lower portion 19 of the plug, which extends wholly within the casing, the cap 21 has the convex surface 22 so that the pressure of the liquid in the passage 28 against it will cause the curved section to straighten out, thus forcing the periphery of the cap against the adjacent wall of the plug which, in turn, expands against the wall of the opening 15 thus insuring a tight seal and joint at the bottom of the plug, as well as at other parts thereof. Upon releasing of the pressure in the passage 28 by the unscrewing of the bolt 29, the wall 18 of the valve is contracted, so as to permit the free rotation of the plug upon the application of any suitable tool to the head 35 of the stem 26.

It is to be understood that the present disclosure of the invention is merely illustrative of a preferred embodiment and that such changes may be made as fall within the purview of one skilled in the art without departing from the spirit of the invention and the scope of the appended claims.

We claim:

1. A valve of the class described comprising a casing having a cylindrical opening provided with a seating surface and inlet and outlet ports communicating with said opening, a rotary expansible and contractible plug mounted in said opening for controlling the flow of fluid through said casing, said plug having an inner wall portion provided with a passage arranged to register with said ports and a spaced cylindrical outer wall portion arranged to engage said seating surface, said walled portions forming a continuous passage therebetween, fluid confined within said continuous passage, and means for varying the pressure of the fluid to force the outer wall portion of the plug into tight engagement with the seating surface or contract the same to permit the rotation of the plug.

2. A valve of the class described, comprising a casing having a cylindrical opening provided with a seating surface and inlet and outlet ports communicating with said opening, a rotary expansible and contractible plug mounted in said opening for controlling the flow of fluid through said casing, said plug having an inner wall portion provided with a passage arranged to register with said ports, and a spaced cylindrical outer wall portion arranged to engage said seating surface and of less thickness than the inner wall portion, a deformable cap connected to one end of the outer wall portion and spaced from the inner wall portion of the plug, means connected to the opposite end of the outer wall portion for rotating the plug, said walled portions, forming a continuous passage therebetween, fluid confined within said passage, and means for varying the pressure of the fluid to force the outer wall portion of the plug into tight engagement with the seating surface or contract the same to permit the rotation of the plug.

3. A valve of the class described, comprising a casing having a cylindrical opening provided with a seating surface and inlet and outlet ports communicating with said opening, a rotary expansible and contractible plug mounted in said opening for controlling the flow of fluid through said casing, said plug having an inner wall portion provided within the passage, arranged to register with said ports and a spaced tubular outer wall portion engaging said seating surface, a flexible closure plate having a convex surface connected to the lower end of the outer wall portion, and spaced from the inner wall portion, an actuating member connected to the upper end of said outer walled portion and having a hollow stem extending from said casing and communicating with said opening, the outer wall portion of said plug being of less thickness than an inner wall portion, said walled portions forming a continuous passage therebetween, fluid confined in said continuous passage and means movably mounted in said stem for varying the pressure of the fluid to cause the contraction and expansion of the outer wall portion of the plug.

4. A valve of the class described comprising a casing having a cylindrical opening provided with a seating surface and inlet and outlet ports communicating with said opening, a rotary expansible and contractible plug mounted in said opening for controlling the flow of fluid through said casing, said plug having an inner wall portion provided with a passage arranged to register with said ports and a spaced tubular outer wall portion rotatably engaging said seating surface, a flexible closure plate connected to the lower end of the outer wall portion and spaced from the inner wall portion, a rigid plate connected to the upper end of said outer wall portion, said rigid plate having an axially disposed threaded bore, fluid confined in the passage formed by the said walled portions and said plates, and means engaging said threaded bore for varying the pressure of the fluid in said passage whereby to cause the expansion and contraction of the outer wall portion to permit rotation of the plug.

5. A valve of the class described having a casing provided with inlet and outlet ports, a rotary deformable plug for controlling the flow of the supply through said ports and having an inner wall provided with a passage arranged to register with said ports and a spaced outer cylindrical wall, and means for moving the outer wall of the plug into and out of engagement with the adjacent wall of the casing.

6. A valve of the class described having a casing provided with inlet and outlet portions, a rotary deformable plug for controlling the flow of the supply through said openings, said plug having spaced inner and outer walled portions of different thickness, fluid confined within the passage formed between said wall portions, and means for varying the pressure of the fluid to move the outer wall of the plug into and out of engagement with the casing.

7. A contractible and expansible plug for rotary valves comprising a body having an inner walled portion provided with a passage and an outer cylindrical walled portion of less thickness than the inner walled portion and spaced therefrom, closure caps secured to the ends of the outer walled portion, said walled portions and caps forming a continuous passage for the circulation of fluid, and means associated with one of the caps for varying the pressure of the fluid.

8. A plug for valves comprising a body having spaced inner and outer walls of non-metallic yieldable material, said walls forming a continuous passage therebetween, the outer wall being of less thickness than the inner wall, fluid arranged to circulate in said passage, and means for varying the pressure of the fluid to cause the expansion and contraction of the outer wall.

9. A plug for rotary valves comprising a body having a cylindrical outer wall and a spaced inner wall with a transverse through passage therein, said walls formed of a non-metallic yieldable material, said outer wall being of less thickness than the inner wall, a continuous passage formed between said walls, a liquid in said continuous passage and means for varying the pressure of the liquid against the outer wall, so as to vary the external diameter thereof.

In testimony whereof we have hereunto set our hands.

ROBERT H. MUELLER.
FRANK H. MUELLER.